(12) United States Patent
Arisaka et al.

(10) Patent No.: US 7,838,784 B2
(45) Date of Patent: Nov. 23, 2010

(54) ELECTRONIC APPARATUS HAVING A HOUSING HAVING A LIQUID DRAIN STRUCTURE

(75) Inventors: Takayuki Arisaka, Fussa (JP); Yuji Nakajima, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 11/889,006

(22) Filed: Aug. 8, 2007

(65) Prior Publication Data

US 2008/0037205 A1 Feb. 14, 2008

(30) Foreign Application Priority Data

Aug. 9, 2006 (JP) ............... 2006-217490

(51) Int. Cl.
*H01H 9/04* (2006.01)
(52) U.S. Cl. .................. 200/302.1; 200/302.2; 200/306
(58) Field of Classification Search ... 200/302.1–302.3, 200/306
See application file for complete search history.

(56) References Cited

U.S. PATENT DOCUMENTS 4,968,862 A * 11/1990 Maeda ....................... 200/306
5,421,659 A * 6/1995 Liang ......................... 400/472
6,156,983 A * 12/2000 Chen et al. ................ 200/302.1
6,443,644 B1 * 9/2002 Takeda et al. ............... 400/490
6,610,644 B1 * 8/2003 Fenney et al. ............... 510/444
6,610,944 B2 * 8/2003 Lee et al. .................. 200/302.1
6,610,994 B1   8/2003 Tanabe

FOREIGN PATENT DOCUMENTS

| JP | 07-234749 | 9/1995 |
| JP | 3089907 U | 8/2002 |
| JP | 2003-122454 | 4/2003 |

* cited by examiner

*Primary Examiner*—Renee S Luebke
*Assistant Examiner*—Lheiren Mae A Caroc
(74) *Attorney, Agent, or Firm*—Pillsbury Winthrop Shaw Pittman, LLP

(57) ABSTRACT

According to one embodiment, an electronic apparatus has a housing. The housing has a first chamber to house circuit components, a second chamber parted from the first chamber, and a keyboard mounting portion to mount a keyboard. The keyboard mounting portion and second chamber are communicatively connected through a liquid inlet. A liquid outlet opening from the second chamber to the housing is formed below the liquid inlet. The liquid outlet has an opening area larger than the liquid inlet.

13 Claims, 10 Drawing Sheets

ELECTRONIC APPARATUS HAVING A HOUSING HAVING A LIQUID DRAIN STRUCTURE

CROSS-REFERENCE TO RELATED APPLICATIONS

This application is based upon and claims the benefit of priority from Japanese Patent Application No. 2006-217490, filed Aug. 9, 2006, the entire contents of which are incorporated herein by reference.

BACKGROUND

1. Field

One embodiment of the present invention relates to an electronic apparatus having a housing provided with a keyboard mounting portion. In particular, one embodiment of the invention relates to a structure for draining liquid to the outside of a housing, when liquid is spilled on a keyboard placed in a keyboard mounting portion.

2. Description of the Related Art

A portable computer has a housing for housing main components such as a printed circuit board and a hard disc drive, for example. The housing has a keyboard mounting portion to mount a keyboard. The keyboard mounting portion is a concave area to firmly hold the keyboard, and provided on the top face of the housing.

An operator may operate the portable computer while drinking coffee, for example. If the operator carelessly spills the drink on the keyboard, the spilled drink may stay in the keyboard mounting portion or flow into the housing through the keyboard mounting portion.

Jpn. Pat. Appln. KOKAI Publication No. 2003-122454 discloses a portable computer, which is constructed to drain liquid that has flowed into a keyboard mounting portion to the outside of a housing. The portable computer has a guide channel having first and second drain holes, and a third drain hole.

The first drain hole is formed in a base plate of a keyboard, and faces the bottom of the keyboard mounting portion. The guide channel is formed on the bottom of the keyboard mounting portion. The guide channel receives liquid drained from the first drain hole, and leads the drained liquid to the second drain hole. The third drain hole is formed in the bottom of the housing, and is located immediately below the second drain hole.

In the above structure, the liquid that has been spilled on the keyboard is led from the keyboard mounting portion to the guide channel through the first drain hole. The liquid that has been led to the guide channel is caused to flow from the second drain hole to the third drain hole, and is discharged to the outside of the housing through the third drain hole.

According to the portable computer, the second and third drain holes open inside the housing, and face each other across a space inside the housing. In other words, as a drain route from the second drain hole to the third drain hole is exposed inside the housing, the spilled liquid inevitably splashes inside the housing while dripping from the second drain hole to the third drain hole.

Particularly, as a printed circuit board is placed around the third drain hole, the liquid splashed inside the housing may adhere to a charging portion of the printed circuit board. As a result, the circuit components mounted on the printed circuit board may be shorted, causing serious damage in the circuit components.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus comprises a housing having a first chamber to house circuit components and a second chamber parted from the first chamber. The housing has a keyboard mounting portion to mount a keyboard, a liquid inlet connecting the keyboard mounting portion and the second chamber, and a liquid outlet opening from the second chamber to the outside of the housing in a part below the liquid inlet. The liquid outlet has an opening area larger than the liquid inlet.

A first embodiment of the invention will be explained hereinafter with reference to FIGS. 1 to 13.

Figure 1:
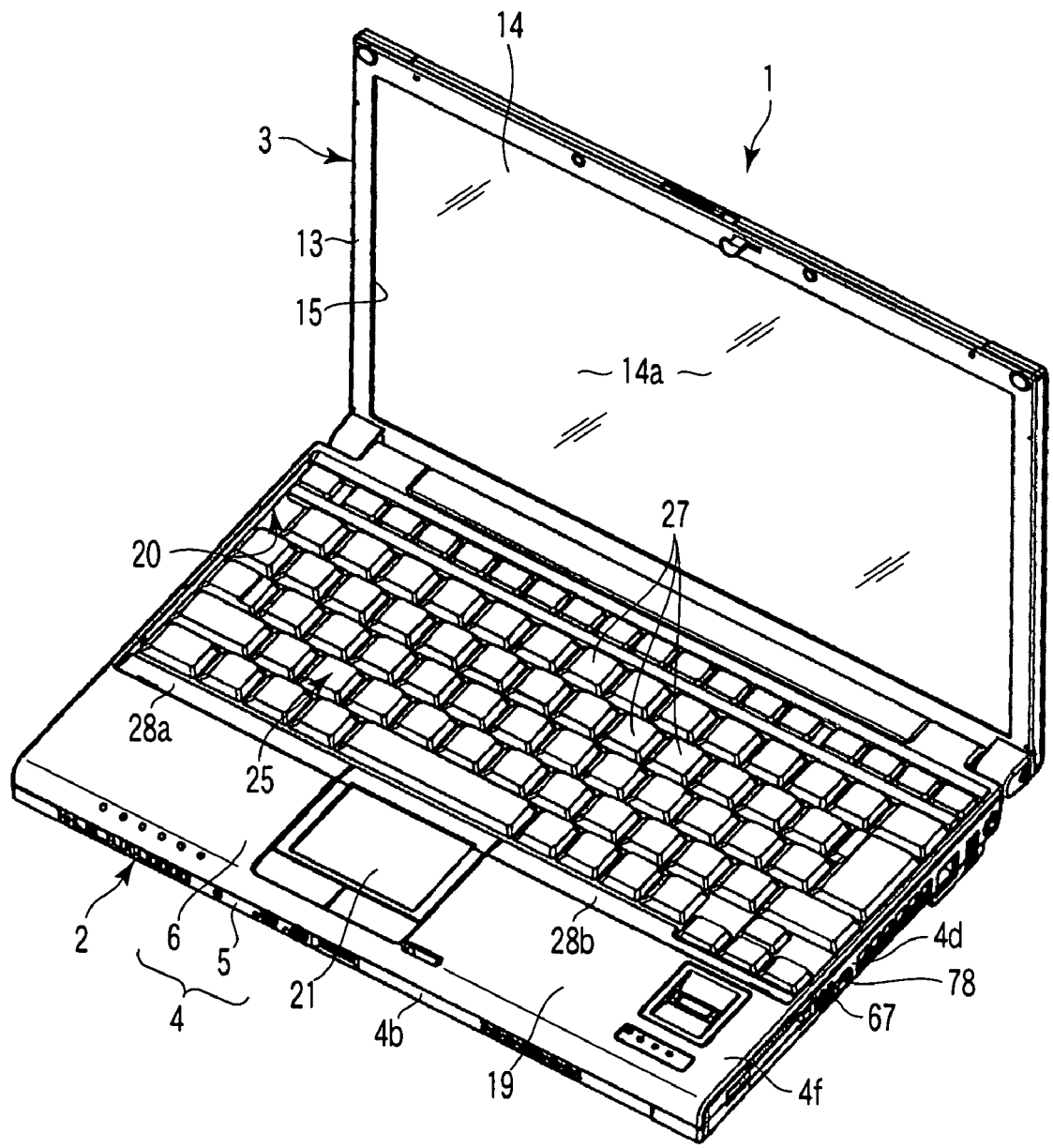
FIG. 1 is a perspective view of an exemplary portable computer according to a first embodiment of the invention.

FIG. 1 shows a portable computer 1 as an example of an electronic apparatus. The portable computer 1 has a main unit 2 and a display unit 3.

The main unit 2 has a flat box-like first housing 4. The first housing 4 is made of light metal material such as magnesium alloy. The first housing 4 has a bottom wall 4*a*, a front wall 4*b*, left/right sidewalls 4*c*/4*d*, a rear wall 4*e*, and an upper wall 4*f*. The sidewalls 4*c* and 4*d* rise from the edge of the bottom wall 4*a*.

Figure 2:
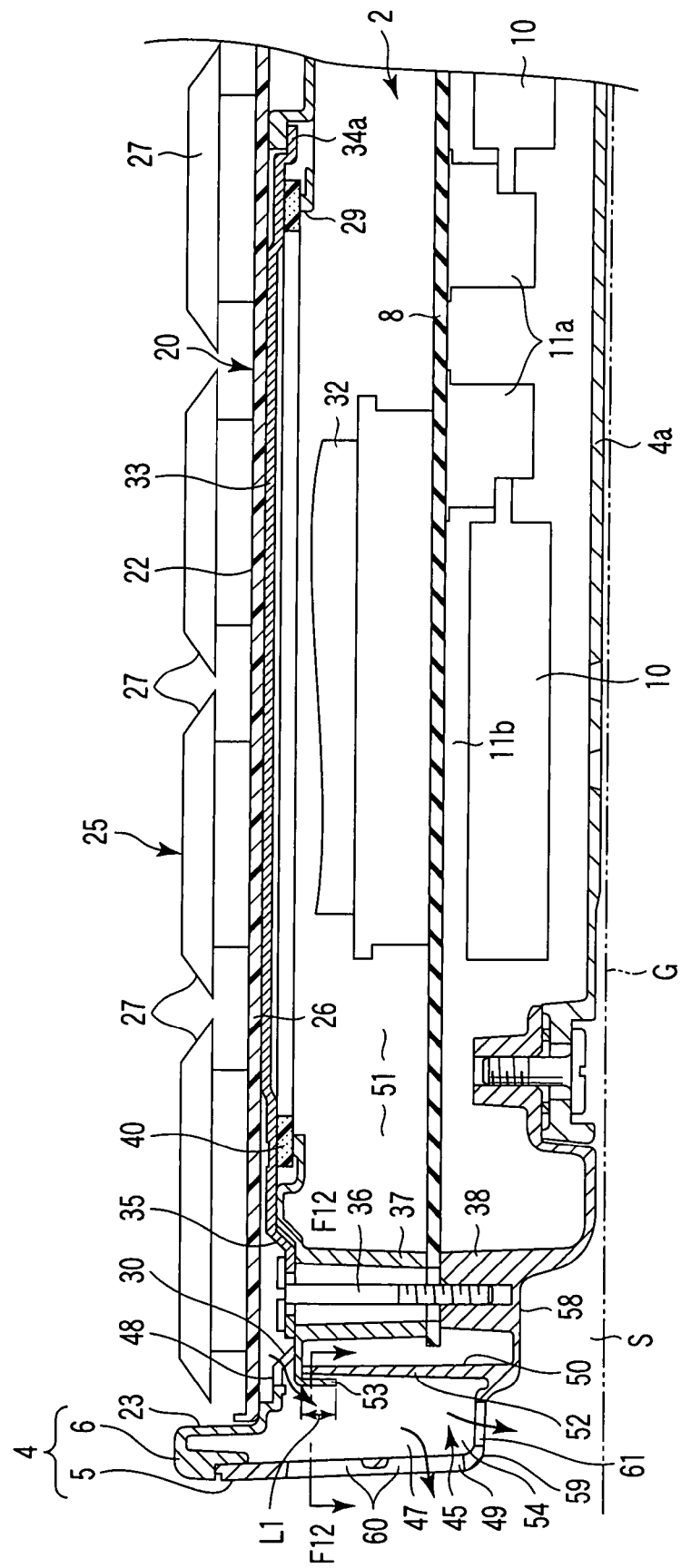
FIG. 2 is an exemplary sectional view of the portable computer of the first embodiment, showing positions of a keyboard, a first drain portion, and circuit components.
Figure 3:
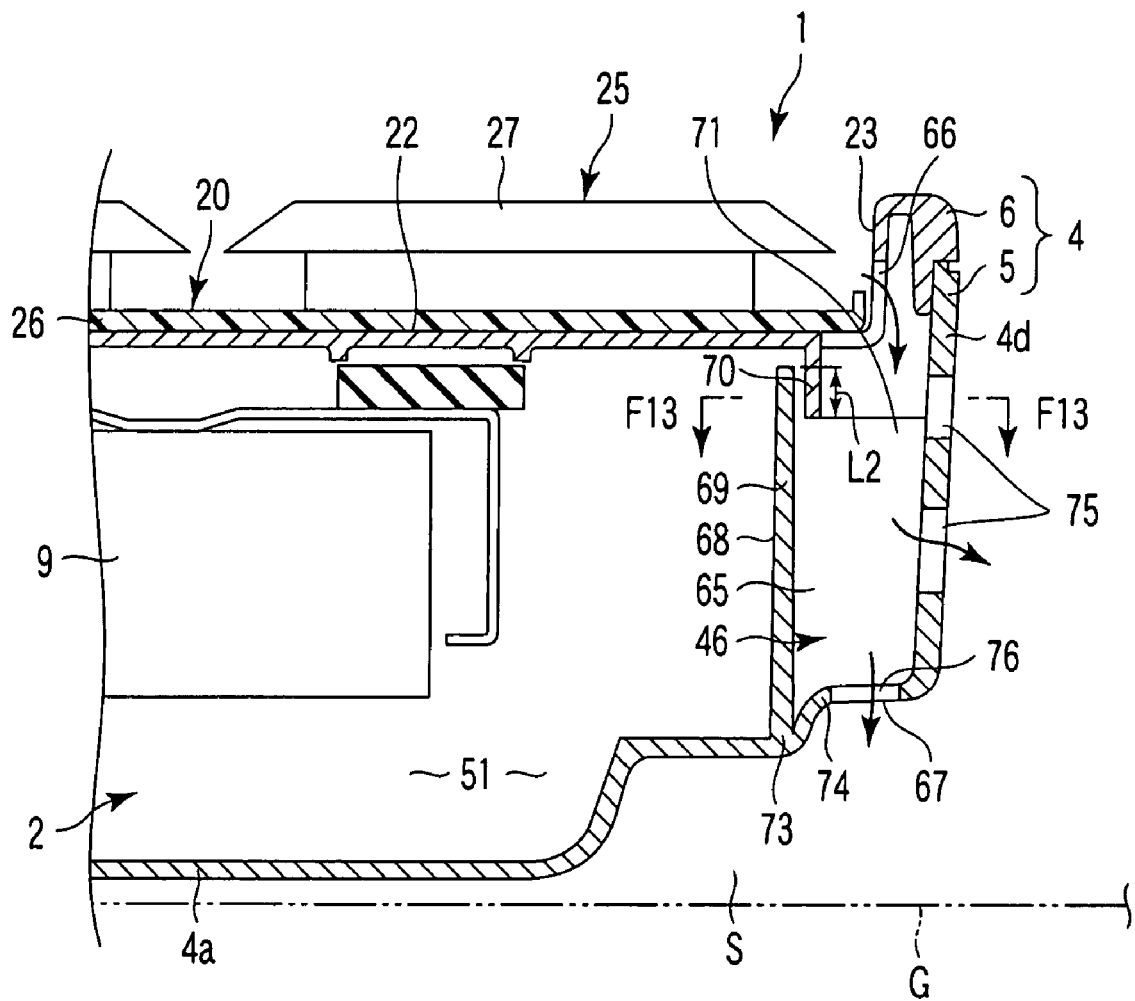
FIG. 3 is an exemplary sectional view of the portable computer of the first embodiment, showing positions of the keyboard, a second drain portion, and circuit components.
Figure 4:
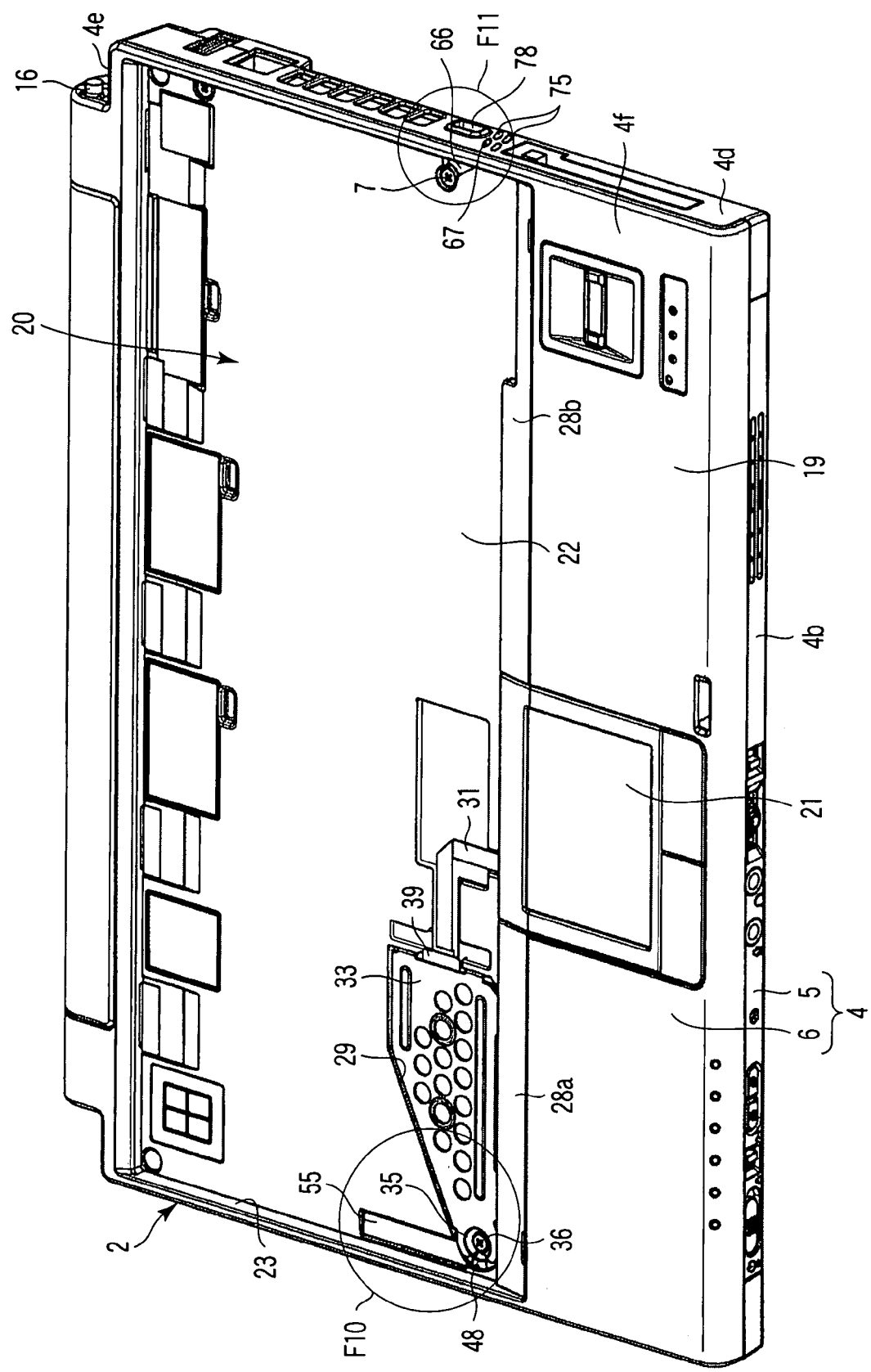
FIG. 4 is an exemplary perspective view of a first housing having a keyboard mounting portion in the first embodiment of the invention.

As shown in FIGS. 2 to 4, the first housing 4 consists of a bottom case 5 and a top cover 6. The bottom case 5 has the bottom wall 4a, the front wall 4b, the sidewalls 4c/4d, and the rear wall 4e. The top cover 6 has the upper wall 4f, and covers the bottom case 5 from above. The bottom case 5 and the top cover 6 are connected through screws 7.

The first housing 4 houses main circuit components such as a printed circuit board 8 and a hard disc drive 9. The printed circuit board 8 is arranged parallel to the bottom wall 4a of the first housing 4. The printed circuit board 8 is provided with connectors 11a to connect memory modules 10, a keyboard connector 11b, and not-shown circuit elements including CPU.

The display unit 3 has a second housing 13. The second housing 13 is shaped like a flat box with substantially the same size as the first housing 4. The second housing 13 houses a liquid crystal display panel 14. The liquid crystal display panel 14 has a screen 14a to display character and image information. The screen 14a is exposed outside the display unit 3 through an opening 15 formed in the front side of the second housing 13.

The display unit 3 is connected to the rear end portion of the main unit 2 through a hinge 16 shown in FIG. 4. The display unit 3 is movable between a closed position and an open position by moving rotationally about the hinge 16. At the closed position, the display unit 3 is laid over the main unit 2. In the open position, the display unit 3 is raised from the rear end of the main unit 2 so as to expose the screen 14a.

The upper wall 4f of the top cover 6 constitutes a top face of the first housing 4. On the top face of the first housing 4, a palm rest 19 and a keyboard mounting portion 20 are formed. The palm rest 19 is positioned in the former half of the top face of the first housing 4, and extends in the width direction of the first housing 4. At the middle of the palm rest 19, a touch pad 21 is provided as an example of a pointing device.

The keyboard mounting portion 20 is placed in the rear of the palm rest 19. The keyboard mounting portion 20 is a rectangular concave area opening to the top face of the first housing 4, and has width extending over the total width of the first housing 4.

As shown in FIGS. 2 to 4, the keyboard mounting portion 20 has a bottom 22 and a standing portion 23. The bottom 22 is placed below the top face of the first housing 4. The standing portion 23 surrounds the bottom 22. The upper edge of the standing portion 23 continues to the top face of the first housing 4.

The keyboard mounting portion 20 holds a keyboard 25. The keyboard 25 has a keyboard base 26, key-tops 27, and not-shown membrane switch.

The keyboard base 26 is shaped like a rectangular plate to be firmly fitted into the keyboard mounting portion 20. In other words, the keyboard base 26 is laid over the bottom 22 of the keyboard mounting portion 20, and surrounded by the standing portion 23. The key-tops 27 are held by the keyboard base 26, and exposed to the top face of the first housing 4. The membrane switch is interposed between the keyboard base 26 and the key-tops 27, and turned on based on the depression of the key-tops 27.

The keyboard 25 is held in the keyboard mounting portion 20 by hanging the rear edge of the keyboard base 26 on the keyboard mounting portion 20 and inserting the front edge of the keyboard base 26 between a pair of keyboard holders 28a/28b and the keyboard mounting portion 20.

Figure 5:
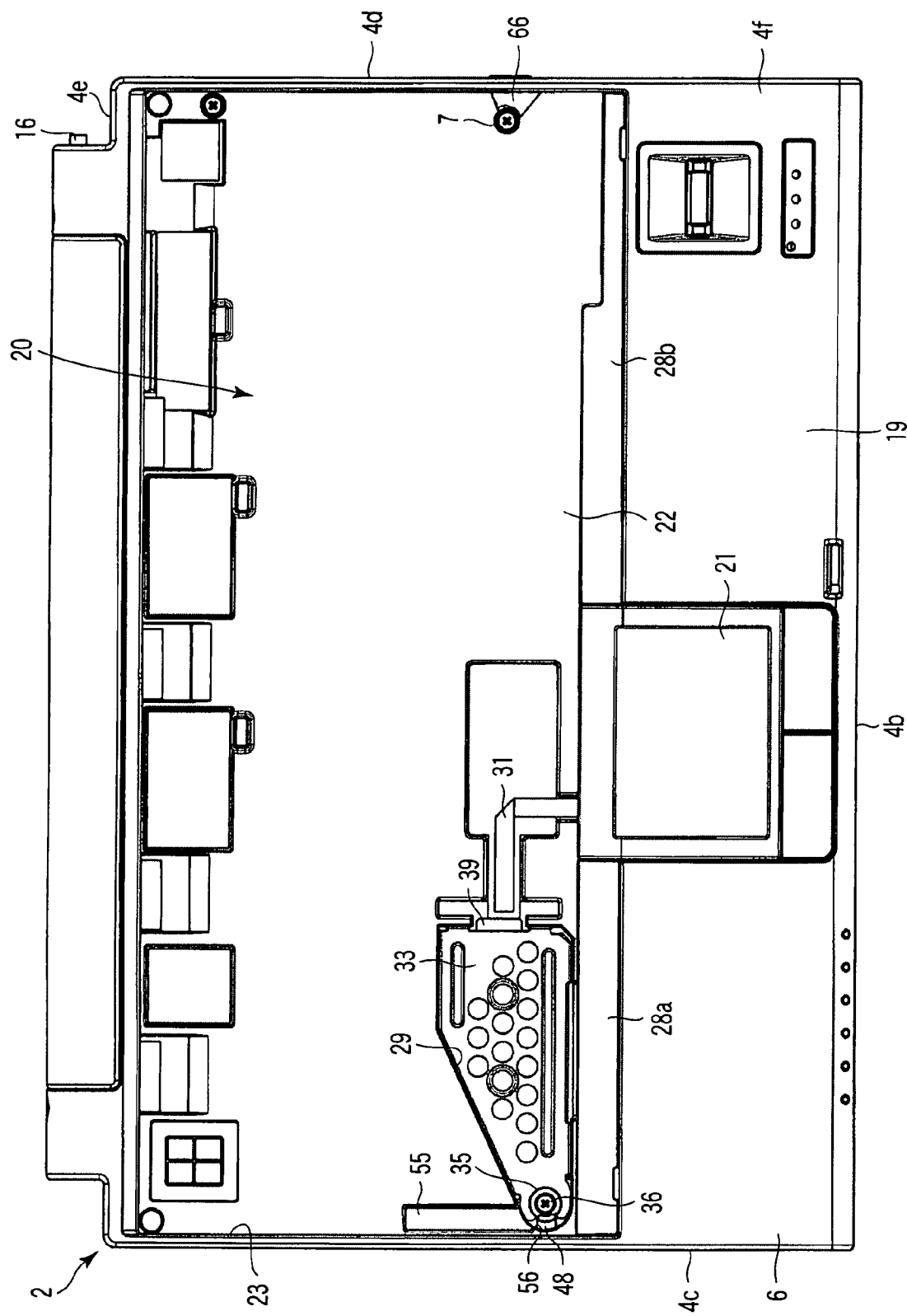
FIG. 5 is an exemplary plan view of the first housing having the keyboard mounting portion in the first embodiment of the invention.

As shown in FIGS. 2, 4 and 5, a cable insertion hole 29 and a concave area 30 are formed on the bottom 22 of the keyboard mounting portion 20. The cable insertion hole 29 is formed in the left side part at the front end of the keyboard mounting portion 20. A first flat cable 31 taken out of the touch pad 21 and a second flat cable 32 taken out of the keyboard 25 are led from the keyboard mounting portion 20 to the inside of the first housing 4 through the cable insertion hole 29. The first flat cable 31 is connected to a not-shown connector on the printed circuit board 8. The second flat cable 32 is connected to the keyboard connector 11b on the printed circuit board 8.

The concave area 30 is placed at a corner defined by the front edge and left-side edge of the keyboard mounting portion 20, and adjacent to a cable insertion hole 29.

Figure 6:
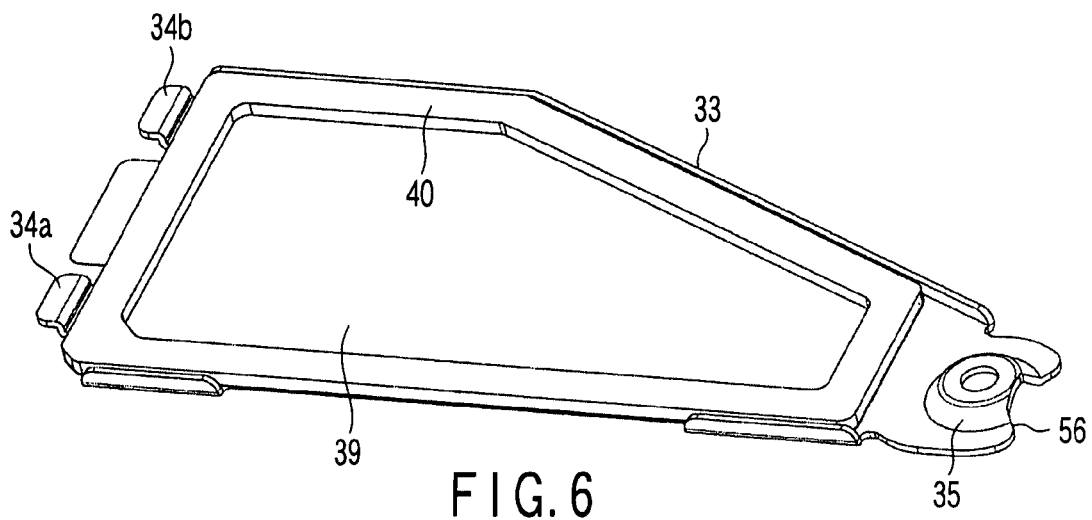
FIG. 6 is an exemplary perspective view of a cover to cover a cable insertion hole in the first embodiment of the invention.

The cable insertion hole 29 is covered in a liquid-tight fashion with a sheet-metal cover 33. As shown in FIG. 6, the cover 33 has a pair of lugs 34a and 34b at one end, and has a cavity 35 at the other end. The lugs 34a and 34b are hung on the bottom 22 of the keyboard mounting portion 20. The cavity 35 is fitted into the concave area 30 of the keyboard mounting portion 20. A screw 36 is inserted into the cavity 35 from the upper side of the keyboard mounting portion 20. As shown in FIG. 2, the screw 36 penetrates through a boss 37 projecting downward from the keyboard mounting portion 20, and screwed into a boss 38 projecting upward from the bottom wall 4a of the bottom case 5.

Therefore, the screw 36 has the functions of fixing the cover 33 to the bottom 22 of the keyboard mounting portion 20, and combining the bottom case 5 with the top cover 6. Further, the bosses 37 and 38 fix the printed circuit board 8 to the first housing 4 by holding the left-end part of the printed circuit board 8.

As shown in FIG. 6, the back of the cover 33 is covered with a waterproof sheet 39. A seal member 40 is stuck to the waterproof sheet 39. The seal member 40 is made of elastic material such as sponge rubber. The seal member 40 is shaped like a loop to be laid along the outer peripheral edge of the cover 33.

FIGS. 2, 4 and 5 show the state that the cover 33 is fixed to the bottom 22 of the keyboard mounting portion 20. When the cover 33 is fixed to the keyboard mounting portion 20, the seal member 40 adheres closely to the peripheral edge of the cable insertion hole 29 in the circumferential direction. Thus, the cable insertion hole 29 is closed in a liquid-tight fashion, and the first and second flat cables 31 and 32 are inserted between the seal member 40 and the peripheral edge of the cable insertion hole 29. As a result, the liquid-tightness of the portions of the first and second flat cables 31 and 32 penetrating the cable insertion hole 30 is ensured.

Figure 8:
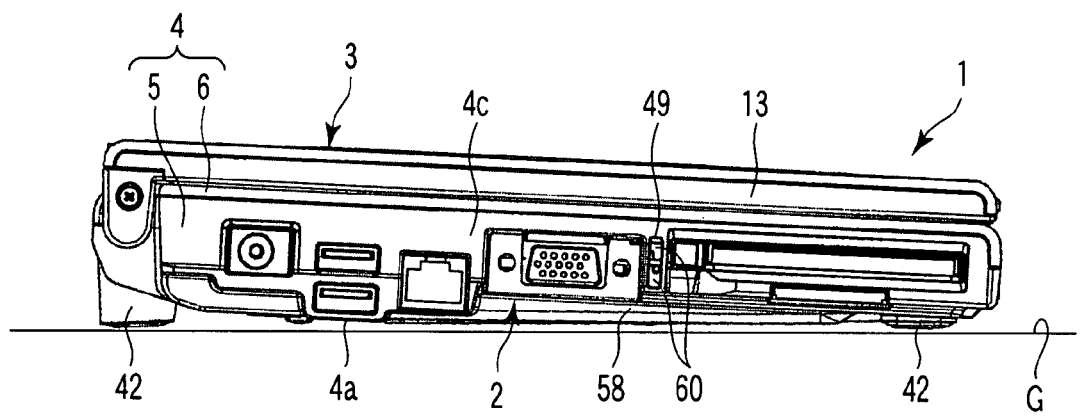
FIG. 8 is an exemplary left-side view of the portable computer according to the first embodiment of the invention.
Figure 9:
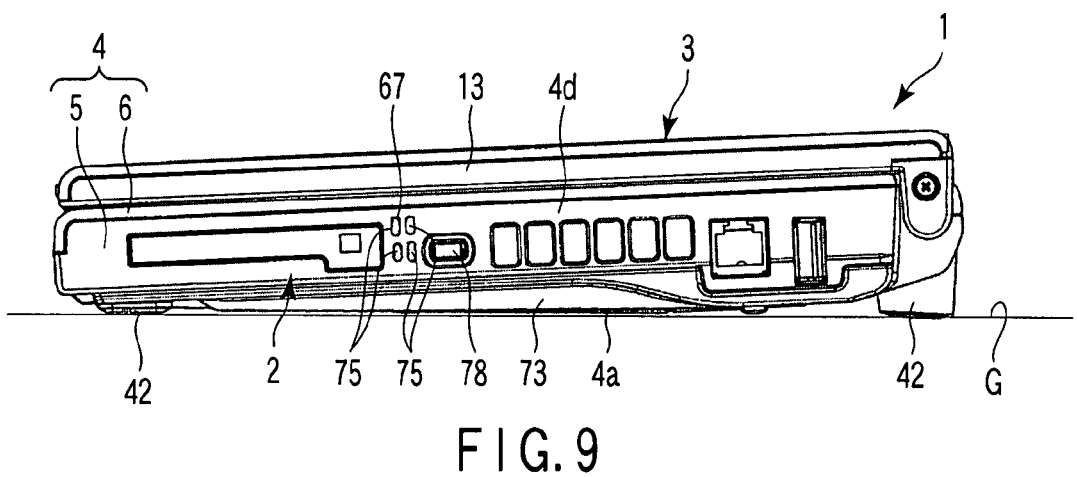
FIG. 9 is an exemplary right-side view of the portable computer according to the first embodiment of the invention.
Figure 7:
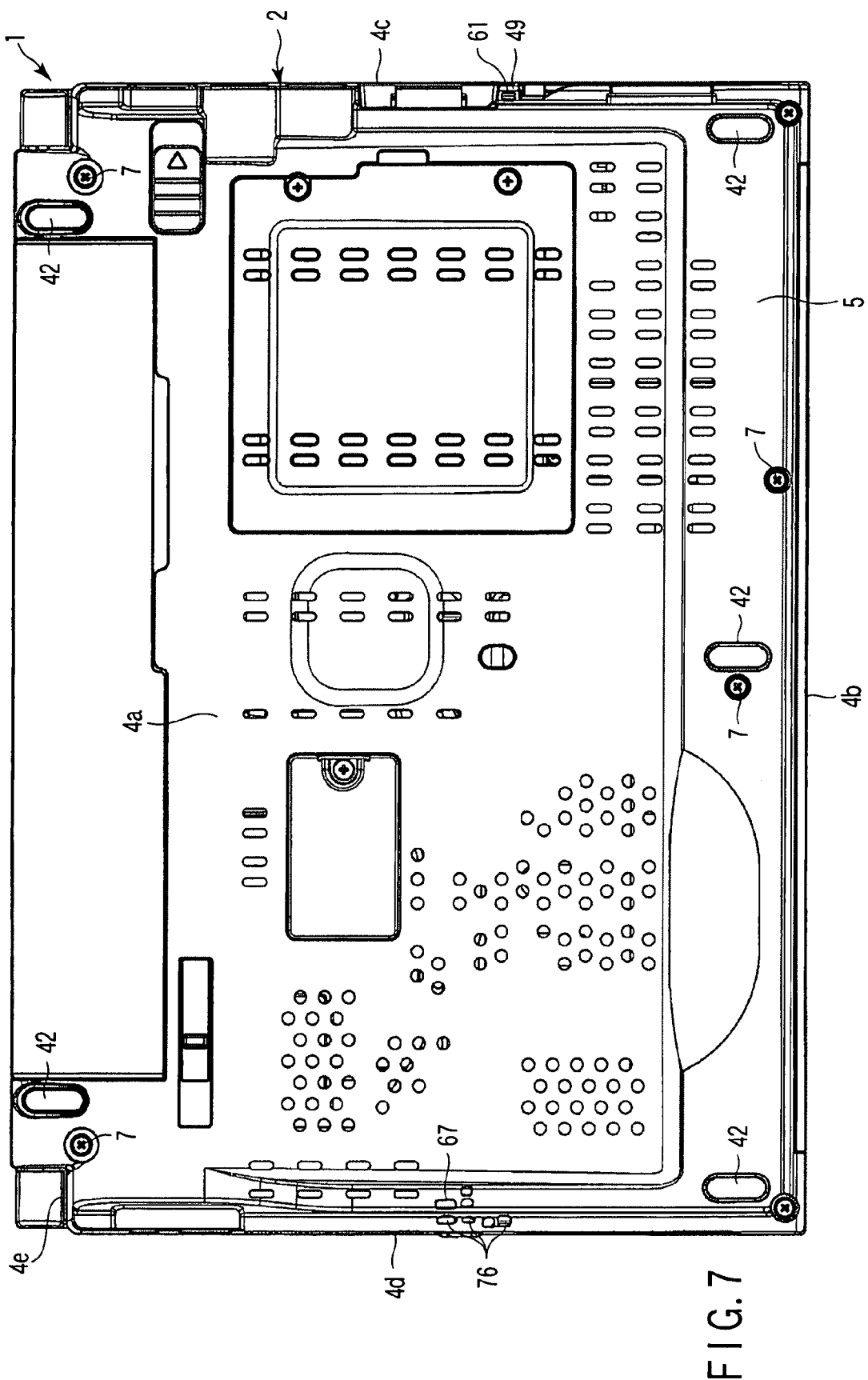
FIG. 7 is an exemplary plan view showing the reversed state of the first housing in the first embodiment.

As shown in FIGS. 7 to 9, the bottom case 5 of the first housing 4 has feet 42. The feet 42 are projected downward from the outer periphery of the bottom wall 4a of the bottom case 5. When the portable computer 1 is mounted on a mounting surface G like a desk top, the feet 42 abut the mounting surface G. Then, the main unit 2 is inclined to a position that the near-hand side of the keyboard 25 becomes low.

Therefore, when the portable computer 1 is placed on the mounting surface G, the bottom 22 of the keyboard mounting portion 20 is inclined downward as it comes close to the front end of the keyboard mounting portion 20.

As shown in FIGS. 2 and 3, the first housing 4 has first and second drain portions 45 and 46. The first drain portion 45 is located right under the left-side part of the front end of the keyboard mounting portion 20. The first drain portion 45 is parted from the circuit components like the printed circuit board 8 disliking moisture by a partition wall 50. In other words, the partition wall 50 partitions the inside of the first housing 4 to the first chamber 51 containing circuit components, and a second chamber 47 adjacent to the first chamber 51. The partition wall 50 is located between first chamber 51 and second chamber 47.

Figure 12:
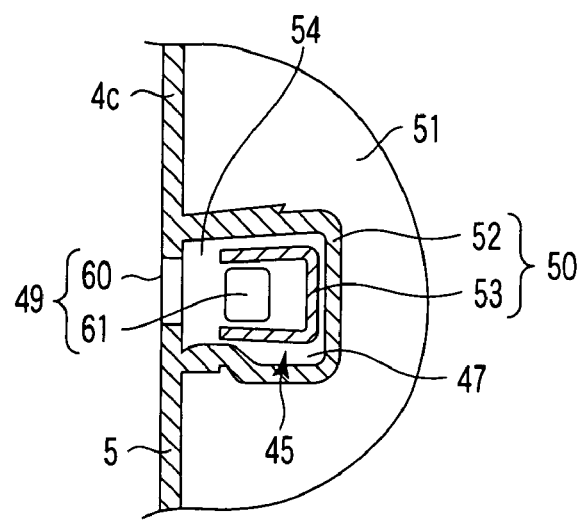
FIG. 12 is an exemplary sectional view taken along lines F12-F12 of FIG. 2.

As shown in FIG. 12, the partition wall 50 consists of a first wall 52 and a second wall 53. The first wall 52 is projected upward from the inside of the bottom wall 4a of the bottom case 5. The first wall 52 forms a cylindrical passage 54 by cooperating with the left-side wall 4c of the first housing 4.

The second wall 53 is projected downward from the portion of the top cover 6 corresponding to the concave area 30 of the keyboard mounting portion 20. The second wall 53 is fitted into the upper end portion of the passage 54, and surrounded by the first wall 52. Therefore, as shown in FIG. 2, the first wall 52 and second wall 53 are overlapped over the area of the length L1 along the thickness direction of the first housing 4.

Figure 10:
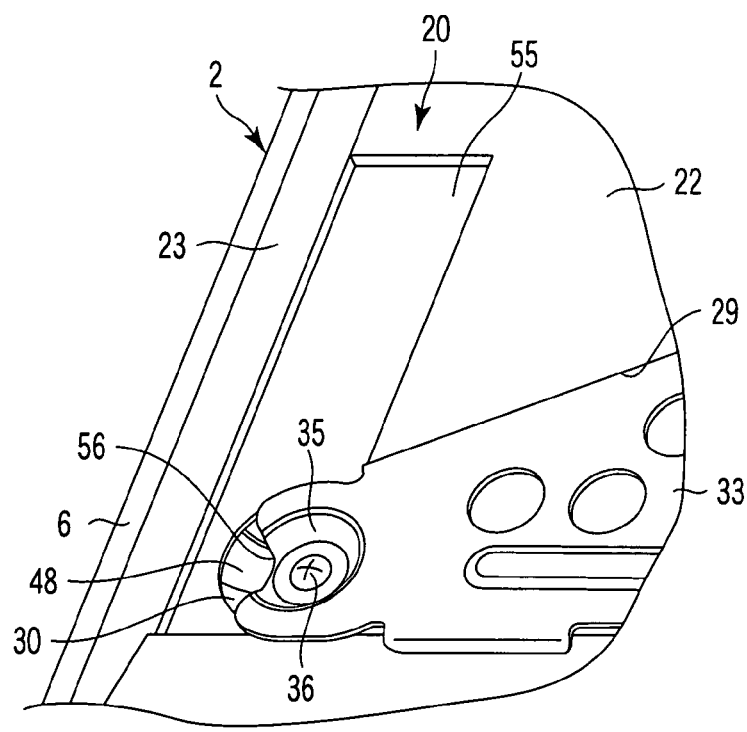
FIG. 10 is an exemplary enlarged perspective view of a F10 part of FIG. 4 in the first embodiment of the invention.

As shown in FIGS. 2 and 10, the first drain portion 45 has a first liquid inlet 48 and a first liquid outlet 49. The first liquid inlet 48 is formed in the concave area 30 of the keyboard mounting portion 20, and communicatively connects the keyboard mounting portion 20 and second chamber 47. The first liquid inlet 48 is opposite to the upper end of the passage 54 through the second wall 53.

A guide groove 55 is formed in the left end portion of the bottom 22 of the keyboard mounting portion 20. The guide groove 55 extends in the depth direction of the first housing 4, and its front end continues to the concave area 30. A notch 56 is formed at the other end of the cover 33 fitted into the concave area 30, in order to avoid the first liquid inlet 48.

As shown in FIGS. 2 and 7, the bottom case 5 of the first housing 4 has a first staged portion 58 that is one step higher than the bottom wall 4a. The first staged portion 58 is located at a corner defined by the bottom wall 4a and left-side wall 4c of the bottom case 5. The first staged portion 58 extends in the depth direction of the first housing 4, and opens to the left side of the first housing 4.

The first staged portion 58 has a bottom 59. The bottom 59 is placed upward the mounting surface G, when the portable computer 1 placed on the mounting surface G. The bottom 59 serves also as a bottom of the second chamber 47.

The first liquid outlet 49 has two or more first drain ports 60 and one second drain port 61. As shown in FIG. 8, the first drain ports 60 are formed vertically in the left-side wall 4c of the bottom case 5. The first drain ports 60 open from the second chamber 47 to the left side of the first housing 4 in the part below the first liquid inlet 48.

The second drain port 61 is formed in the bottom 59 of the staged portion 58. The second drain port 61 opens from the second chamber 47 downward the first staged portion 58 in the part below the second liquid inlet 48.

The total opening area of the first and second drain ports 60 and 61 is larger than the opening area of the first liquid inlet 48. Therefore, when liquid such as drinking water flows into the second chamber 47 from the first liquid inlet 48, the amount of liquid flowing out of the first housing 4 through the first liquid outlet 49 is larger than the amount of liquid flowing into the second chamber 47.

As shown in FIG. 3, the second drain portion 46 is located right under the right-side part of the front end of the keyboard mounting portion 20. The second drain portion 46 is parted from the circuit components such as the printed circuit board 8 by a partition wall 68. In other words, the partition wall 68 partitions the inside of the first housing 4 to the first chamber 51 containing the above circuit components, and another second chamber 65 adjacent to the first chamber 51. The partition wall 68 is located between first chamber 51 and second chamber 65.

Figure 13:
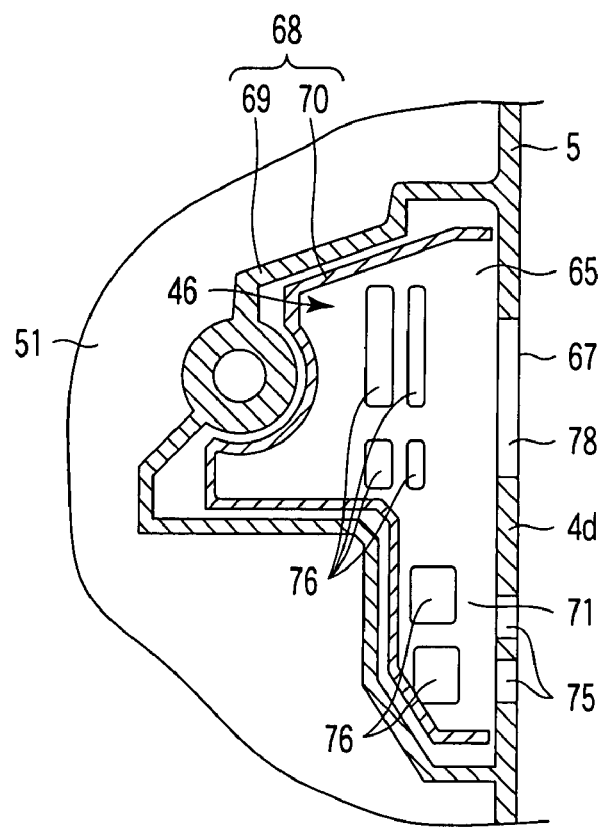
FIG. 13 is an exemplary sectional view taken along lines F13-F13 of FIG. 3.

As shown in FIG. 13, the partition wall 68 consists of a first wall 69 and a second wall 70. The first wall 69 is projected upward from the inside of the bottom wall 4a of the bottom case 5. The first wall 69 forms a cylindrical passage 71 by cooperating with the right-side wall 4d of the first housing 4.

The second wall 70 is projected downward from the portion corresponding to the right end part of the front end of the keyboard mounting portion 20. The second wall 70 is fitted into the upper end portion of the passage 71, and surrounded by the first wall 69. Therefore, as shown in FIG. 3, the first wall 69 and second wall 70 are overlapped over the area of the length L2 along the thickness direction of the first housing 4.

Figure 11:
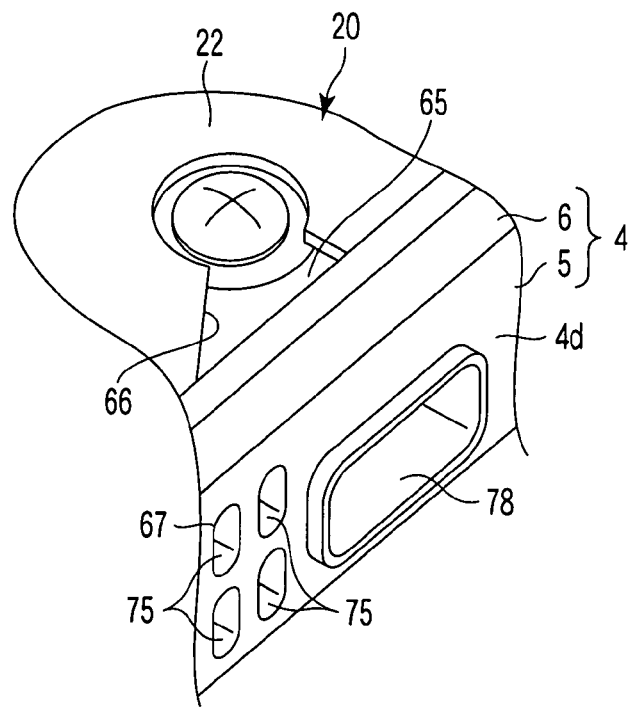
FIG. 11 is an exemplary enlarged perspective view of an F11 part of FIG. 4 in the first embodiment of the invention.

As shown in FIGS. 3 and 11, the second drain portion 46 has a second liquid inlet 66 and a second liquid outlet 67. The second liquid inlet 66 is formed in an area from the bottom 22 of the keyboard mounting portion 20 to the standing portion 23, and communicatively connects the keyboard mounting portion 20 and second chamber 65. The second liquid inlet 66 is opposite to the upper end of the passage 71 through the second wall 70.

As shown in FIGS. 3 and 7, the bottom case 5 of the first housing 4 has a second staged portion 73 that is one step higher than the bottom wall 4a. The second staged portion 73 is located at a corner defined by the bottom wall 4a and right-side wall 4d of the bottom case 5. The second staged portion 73 extends in the depth direction of the first housing 4, and opens to the right side of the first housing 4. The second staged portion 73 has a bottom 74. The bottom 74 is placed upward the mounting surface G, when the portable computer 1 placed on the mounting surface G. The bottom 74 serves also as a bottom of the second chamber 65.

As shown in FIGS. 3 and 9, the second liquid outlet 67 has two or more first drain ports 75 and two or more second drain ports 76. The first drain ports 75 are formed vertically in two rows in the right-side wall 4d of the bottom case 5. The first drain ports 75 open from the second chamber 65 to the right side of the first housing 4 in the part below the second liquid inlet 66. According to this embodiment, the upper end of the first wall 69 is located above the first drain ports 75.

The second drain ports 76 are formed in the bottom 74 of the second staged portion 73, and arranged in two rows in the depth direction of the bottom case 5. The second drain ports 76 opens downward from the second chamber 65 in the part below the second liquid inlet 66. According to this embodiment, the second liquid inlet 66 is located right above a part of the second drain ports 76.

The total opening area of the first and second drain ports 75 and 76 is larger than the opening area of the second liquid inlet 66. Therefore, when liquid such as drinking water flows into the second chamber 65 from the second liquid inlet 66, the amount of liquid flowing out of the first housing 4 through the second liquid outlet 67 is larger than the amount of liquid flowing into the second chamber 65.

As shown in FIGS. 9 and 13, a lock hole 78 is formed in the right-side wall 4d of the bottom case 5. The lock hole 78 is used to connect a so-called Kensington lock as a theft-prevention device. The lock hole 78 has an opening larger than the first and second drain ports 75 and 76, and opens to the second chamber 65. Therefore, the lock hole 78 also serves as the second liquid outlet 67 when the theft-prevention device is not connected.

Next, the functions of the above configuration will be explained.

When an operator carelessly spills liquid such as drinking water on the keyboard 25 while operating the portable computer 1, the spilled liquid flows into the keyboard base 26 through a key-top clearance.

The liquid that has flowed into the keyboard base 26 flows from the outer peripheral edge of the keyboard base 26 into the outer periphery of the keyboard mounting portion 20. In the state that the portable computer 1 is placed on the mounting surface G, the main unit 2 is inclined so that the near-hand side of the keyboard 25 becomes lower. Therefore, much of the liquid that has flowed into the keyboard mounting portion 20 is collected in the front end part of the keyboard mounting portion 20.

In the portable computer 1 according to the first embodiment, the first liquid inlet 48 is located on the left-side part of the front end of the keyboard mounting portion 20, and the second liquid inlet 66 is located in the right-side part of the front end of the keyboard mounting portion 20. Therefore, the liquid collected in the front end part of the keyboard mounting portion 20 flows into two chambers 47 and 65 from the first and second liquid inlets 48 and 66. Particularly, the liquid that has flowed into the left side of the keyboard mounting portion 20 is positively led to the first liquid inlet 48 along the guide groove 55 formed on the bottom 22.

The liquid that has flowed into the second chambers 47 and 65 is discharged to the outside of the first housing 4 through the first and second liquid outlets 49 and 67.

According to the portable computer 1 configured as above, the first liquid outlet 49 to discharge the liquid that has flowed into the second chamber 47 to the outside of the first housing 4 has an opening area larger than the first liquid inlet 48. Likewise, the second liquid outlet 67 to discharge the liquid that has flowed into the second chamber 65 to the outside of the first housing 4 has an opening area larger than the second liquid inlet 66.

Therefore, when the liquid that has been spilled on the keyboard 25 is discharged to the outside of the first housing 4 through the second chambers 47 and 65, much of the liquid is momentarily discharged to the outside of the housing 4 from the second chambers 47 and 65. The liquid that has flowed into the second chambers 47 and 65 does not overflow into the first chamber 51 containing the circuit components such as the printed circuit board 8 disliking moisture.

As a result, the liquid that has been spilled on the keyboard 25 is prevented from adhering to the circuit components, and fatal damages of the circuit components can be avoided.

Further, the partition wall 50 provided between the first chamber 51 and second chamber 47 is composed of the first wall 52 projected upward from the bottom wall 4a of the bottom case 5, and the second wall 53 projected downward from the keyboard mounting portion 20 of the top cover 6. Likewise, the partition wall 68 provided between the first chamber 51 and second chamber 65 is composed of the first wall 69 projected upward from the bottom wall 4a of the bottom case 5, and the second wall 70 projected downward from the keyboard mounting portion 20 of the top cover 6. The first walls 52 and 69 form the cylindrical passages 54 and 71 by cooperating with the sidewalls 4c and 4d of the bottom case 5, and surround the second walls 53 and 70.

According to the above configuration, the area surrounded by the first walls 52 and 69 is wider than the area surrounded by the second walls 53 and 70. Therefore, when liquid flows from the area surrounded by the second walls 53 and 70 into the area surrounded by the first walls 52 and 69, the liquid swiftly flows to the first and second liquid outlets 49 and 67 without staying in the boundary portion of the two areas.

Therefore, the flow of liquid becomes smooth in the second chambers 47 and 65, and the liquid that has flowed from the keyboard 25 into the keyboard mounting portion 20 can be speedily discharged to the outside of the first housing 4.

In addition, the first wall 52 and second wall 53 overlap in the thickness direction of the first housing 4, and the first wall 69 and second wall 70 also overlap in the thickness direction of the first housing 4. Therefore, the overlapping parts of the first walls 52/69 and second walls 53/70 serve as a weir to prevent the flow of liquid from the second chambers 47 and 65 to the first chamber 51.

As a result, much of the liquid is momentarily discharged from the second chambers 47 and 65, and certainly prevented from flowing into the first chamber 51 as well.

Further, as liquid is momentarily discharged from the second chambers 47 and 65, the liquid that has flowed into the second chambers 47 and 65 does not flow into the clearance between the first walls 52/69 and second walls 53/70. Therefore, packing for sealing the clearance between the first walls 52/69 and second walls 53/70 becomes unnecessary. This is advantageous from the viewpoint of cost reduction.

In the above configuration, the second drain port 61 of the first liquid outlet 49 opens at the bottom 59 of the first staged portion 58 that is one step higher than the bottom wall 4a of the bottom case 5. Likewise, the second drain port 76 of the second liquid outlet 67 open at the bottom 74 of the second staged portion 73 that is one step higher than the bottom wall 4a of the bottom case 5.

Therefore, as best shown in FIGS. 2 and 3, in the state that the portable computer 1 is placed on the mounting surface G, a clearance S corresponding to the height of the first and second staged portions 58 and 73 is formed between the mounting surface G and second drain ports 61/76. As a result, the flow of liquid discharged from the second drain ports 61 and 76 is not interrupted by the mounting surface G. Therefore, the liquid in the second chambers 47 and 65 can be speedily discharged from the second drain ports 61 and 76.

At the same time, as the first and second staged portions 58 and 73 open to the side of the first housing 4, it is possible to easily check by viewing whether liquid is discharged from the first and second liquid outlets 49 and 67.

In addition, according to the above configuration, the first walls 52 and 69 of the partition walls 50 and 68 can be made as one body with the bottom case 5, and the second walls 53 and 70 can be made as one body with the top cover 6. Therefore, a particular element for parting the second chambers 47 and 65 becomes unnecessary in the first housing 4. This is contributive to reduce the cost of the portable computer 1.

The present invention is not to be specified to the above-mentioned first embodiment. The invention may be embodied in other specific forms without departing from its spirit or essential characteristics.

Figure 14:
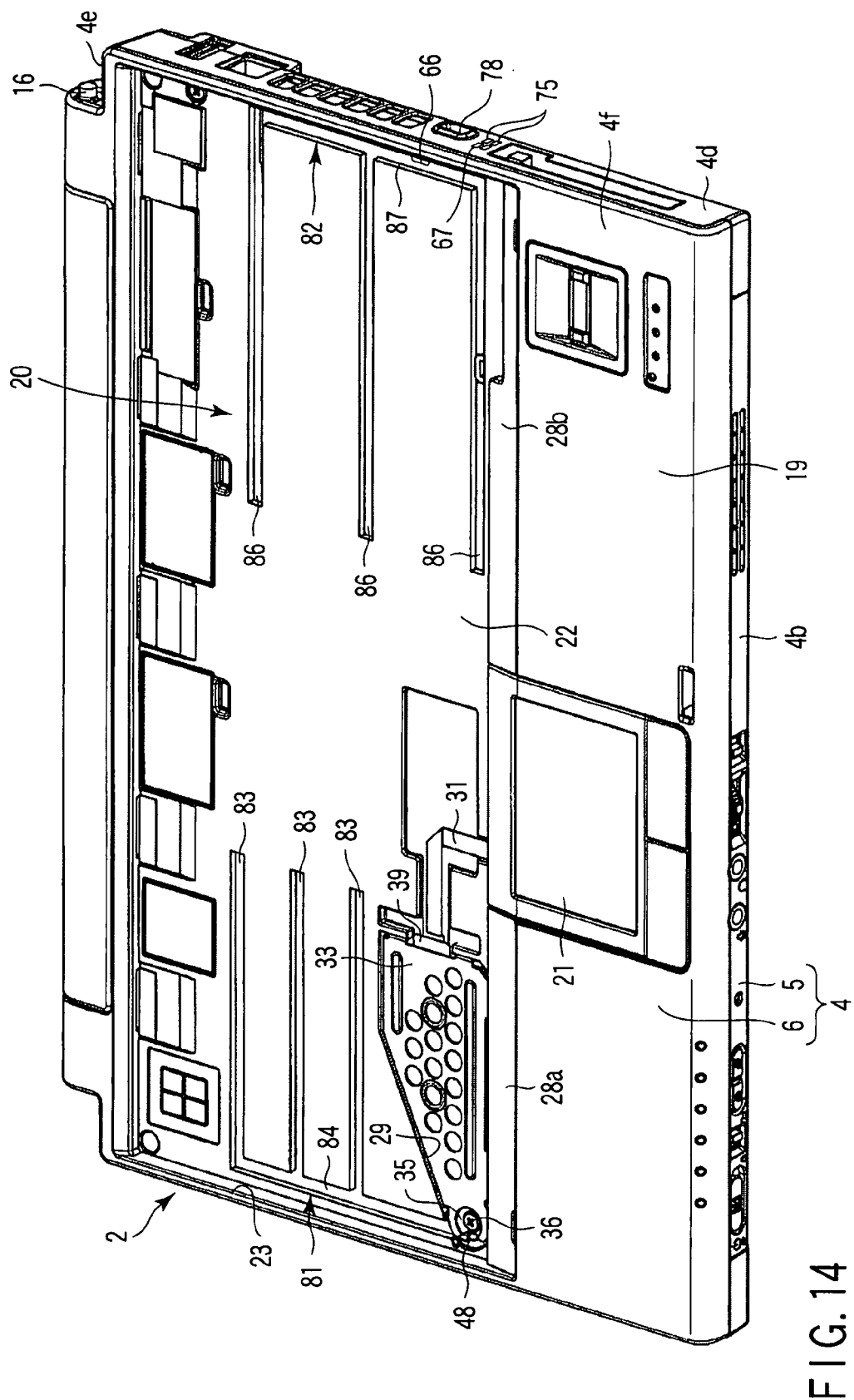
FIG. 14 is an exemplary perspective view of a first housing according to a second embodiment of the invention.

For example, FIG. 14 shows a second embodiment of the invention.

The second embodiment is different from the first embodiment in the configuration of the keyboard mounting portion 20. The configuration of the main unit 2 is the same as in the first embodiment. Therefore, in the second embodiment, the same components as those in the first embodiment are given the same reference numerals, and explanation on these same components will be omitted.

As shown in FIG. 14, a first drain passage 81 and second drain passage 82 are formed on the bottom 22 of the keyboard mounting portion 20. The first drain passage 81 corresponds to the first drain portion 45, and located on the left side rather than the center along the width direction of the bottom 22. The first drain passage 81 has three first grooves 83 and one second groove 84.

The first grooves 83 extend in the width direction of the keyboard mounting portion 20, and are parallel to one another with an interval in the depth direction of the keyboard mounting portion 20. The second groove 84 extends in the depth direction of the keyboard mounting portion 20, and its front end is connected to the concave area 30 of the bottom 22. The second groove 84 is provided over the left end portions of the first grooves 83. Therefore, the first grooves 83 and second groove 84 are connected to one another on the bottom 22.

The first grooves 83 desirably become deep as they advance to the second groove 84. Likewise, the second groove 84 desirably becomes deep as it advances to the concave area 30.

The second drain passage 82 corresponds to the second drain portion 46, and located on the right side rather than the center along the width direction of the bottom 22. The second drain passage 82 has three first grooves 86 and one second groove 87.

The first grooves 86 extend in the width direction of the keyboard mounting portion 20, and are parallel to one another with an interval in the depth direction of the keyboard mounting portion 20. The second groove 87 extends in the depth direction of the keyboard mounting portion 20, and crosses over the liquid inlet 66. The second groove 87 is provided over the right end portions of the first grooves 86. Therefore, the first grooves 86 and second groove 87 are connected to one another on the bottom 22.

The first grooves 86 desirably become deep as they advance to the second groove 87. Likewise, the second groove 87 desirably become deep as it advances to the second liquid inlet 67.

In the above configuration, when liquid that has been spilled on the keyboard 25 flows into the keyboard mounting portion 20, a part of the liquid that has flowed into the left half of the keyboard mounting portion 20 is positively led to the first liquid inlet 48 through the first and second grooves 83 and 84. A part of the liquid that has flowed into the right half of the keyboard mounting portion 20 is positively led to the second liquid inlet 66 through the first and second grooves 86 and 87.

Therefore, the liquid that has flowed into the keyboard mounting portion 20 can be speedily led to the first and second drain portions 45 and 46. Therefore, the liquid that has been spilled on the keyboard 25 has little tendency to stay in the keyboard mounting portion 20.

The liquid drain structure according to the present invention is not specified to a portable computer. The structure is applicable to other electronic apparatus having a keyboard.

While certain embodiments of the inventions have been described, there embodiments have been presented by way of example only, and are not intended to limit the scope of the invention. Indeed, the novel methods and systems described herein may be embodied in a variety of other forms; furthermore various omissions, substitutions and changes in the form of the methods and systems described herein may be made without departing form the spirit of the inventions. The accompanying claims and their equivalents are intended to cover such form or modifications as would fall within the scope and sprit of the inventions.

What is claimed is:

1. An electronic apparatus comprising:
    a housing which has a first chamber to house circuit components and a second chamber partitioned from the first chamber;
    a keyboard mounting portion which is provided on a top face of the housing, and on which a keyboard is mounted;
    a liquid inlet which communicatively connects the keyboard mounting portion and the second chamber, the liquid inlet configured to guide liquid into the second chamber; and
    a liquid outlet which is opened from the second chamber to the outside of the housing in a part below the liquid inlet, the liquid outlet having an opening area larger than the liquid inlet,
    wherein the housing has a bottom wall and a side wall standing from an edge of the bottom wall, and the liquid outlet includes at least one first drain port opened in the side wall, and at least one second drain port opened in the bottom wall.

2. The electronic apparatus according to claim 1, wherein the bottom wall of the housing has a staged portion that is one step higher than the bottom wall at a position corresponding to the second chamber, and the second drain port is formed in the staged portion.

3. The electronic apparatus according to claim 1, wherein at least a part of the liquid inlet is opposite to the second drain port.

4. The electronic apparatus according to claim 1, wherein the housing has a partition wall provided between the first chamber and second chamber.

5. The electronic apparatus according to claim 4, wherein the housing includes a bottom case having the liquid outlet and a top cover having the keyboard mounting portion and liquid inlet, and the partition wall has a first wall projected upward from the bottom case and a second wall projected downward from the top cover.

6. The electronic apparatus according to claim 5, wherein the upper end of the first wall is located above the first drain port.

7. The electronic apparatus according to claim 5, wherein the first wall and second wall are overlapped each other in the thickness direction of the housing.

8. The electronic apparatus according to claim 7, wherein the first wall surrounds the second wall.

9. An electronic apparatus comprising:
    a housing having a bottom wall and a side wall standing from an edge of the bottom wall, an inside of the housing being divided into a first chamber housing circuit components and a second chamber adjacent to the first chamber;
    a keyboard mounting portion which is provided on a top face of the housing, and on which a keyboard is mounted;
    a liquid inlet which communicatively connects the keyboard mounting portion and the second chamber; and
    a liquid outlet which is opened from the second chamber to an outside of the housing in a part below the liquid inlet, the liquid outlet including at least one first drain port opened in the side wall, and at least one second drain port opened in the bottom wall.

10. The electronic apparatus according to claim 9, wherein the liquid outlet has an opening area larger than the liquid inlet.

11. The electronic apparatus according to claim 9, wherein the keyboard has a flat cable which is connected to the circuit component, the keyboard mounting portion has a bottom on which a cable insertion hole through which the flat cable is led is formed, and the cable insertion hole is covered with a cover fixed to the bottom.

12. The electronic apparatus according to claim 11, wherein the cover includes a seal member, the seal member being shaped like a loop to be laid along an outer peripheral edge of the cover, and when the cover is fixed to the bottom of the keyboard mounting portion, the seal member coming into contact with a peripheral edge defining the cable insertion hole.

13. The electronic apparatus according to claim 12, wherein when the cover is fixed to the bottom of the keyboard mounting portion, the flat cable is inserted between the peripheral edge defining the cable insertion hole and the seal member of the cover.

\* \* \* \* \*